US012336639B2

(12) United States Patent
Kato et al.

(10) Patent No.: US 12,336,639 B2
(45) Date of Patent: Jun. 24, 2025

(54) ROCKING DEVICE AND CONTROL METHOD

(71) Applicants: TOYOTA BOSHOKU KABUSHIKI KAISHA, Aichi (JP); UNIVERSITY OF TSUKUBA, Ibaraki (JP)

(72) Inventors: Yasuhiro Kato, Aichi (JP); Akio Shimizu, Aichi (JP); Takahiro Harita, Aichi (JP); Takashi Abe, Ibaraki (JP)

(73) Assignees: TOYOTA BOSHOKU KABUSHIKI KAISHA, Aichi (JP); UNIVERSITY OF TSUKUBA, Ibaraki (JP)

( * ) Notice: Subject to any disclaimer, the term of this patent is extended or adjusted under 35 U.S.C. 154(b) by 141 days.

(21) Appl. No.: 18/134,168

(22) Filed: Apr. 13, 2023

(65) Prior Publication Data

US 2023/0346125 A1 Nov. 2, 2023

(30) Foreign Application Priority Data

Apr. 28, 2022 (JP) ................................. 2022-075414

(51) Int. Cl.
*A47C 3/025* (2006.01)

(52) U.S. Cl.
CPC .................................. *A47C 3/0251* (2018.08)

(58) Field of Classification Search
CPC ............................ A47C 3/0251; A47C 3/0255
See application file for complete search history.

(56) References Cited

U.S. PATENT DOCUMENTS

2002/0140263 A1* 10/2002 Sato ..................... A47D 9/057
297/260.1
2007/0010338 A1* 1/2007 Wu ....................... A47D 13/105
472/119
2011/0248535 A1* 10/2011 LaPointe .................. A47C 3/02
297/260.2
2021/0177147 A1* 6/2021 Shih ........................ B60N 2/045
2023/0347794 A1* 11/2023 Verhoeven ........ B60W 60/0013

FOREIGN PATENT DOCUMENTS

| CN | 108354367 A | * | 8/2018 | ........... A47C 3/0255 |
| CN | 108601452 A | * | 9/2018 | ............. A47C 11/00 |
| EP | 2198751 A1 | * | 6/2010 | ........... A47C 3/0251 |
| EP | 2446914 A1 | * | 5/2012 | ........... A47C 3/0251 |
| JP | H08-89377 A | | 4/1996 | |
| JP | 2002-345606 A | | 12/2002 | |
| WO | WO-2009128362 A1 | * | 10/2009 | ........... A47C 3/0251 |
| WO | WO-2024020158 A1 | * | 1/2024 | |

* cited by examiner

*Primary Examiner* — Timothy J Brindley
(74) *Attorney, Agent, or Firm* — Greenblum & Bernstein, P.L.C.

(57) ABSTRACT

A rocking device includes: a seat which supports a body of a user; a motor which rotates a rotation shaft in a first rotation direction and in a second rotation direction that is a rotation direction opposite to the first rotation direction, and thereby supplies motive power for rocking the seat via a gear attached to the rotation shaft; and a controller which controls rocking of the seat via the motor. The seat is configured to make a first motion of moving in a first movement direction, in accordance with rotation of the rotation shaft in the first rotation direction, and make a second motion of moving in a second movement direction, in accordance with rotation of the rotation shaft in the second rotation direction. The controller is configured to control rocking of the seat such that a prescribed stopped period is provided between the first motion and second motion.

9 Claims, 4 Drawing Sheets

ROCKING DEVICE AND CONTROL METHOD

This Nonprovisional application claims priority under 35 U.S.C. § 119 on Patent Application No. 2022-075414 filed in Japan on Apr. 28, 2022, the entire contents of which are hereby incorporated by reference.

TECHNICAL FIELD

The present disclosure relates to a rocking device and a control method.

BACKGROUND ART

Rocking devices which rock a seat or the like on given cycle so as to provide relaxation to a user and contribute to inducing sleep are known in prior art. Patent Literature 1 discloses an amplitude-fluctuating rocking control device which imparts suitable fluctuations to the amplitude of rocking of a seat. Patent Literature 2 discloses an automatic rocking device which renders smooth the rocking of a rocking table and provides enhanced comfort to an infant.

CITATION LIST

Patent Literature

[Patent Literature 1]
Japanese Patent Application Publication, Tokukai, No. 2002-345606
[Patent Literature 2]
Japanese Patent Application Publication, Tokukaihei, No. 8-89377

SUMMARY OF INVENTION

Technical Problem

The above-described prior art has the problem that acceleration changes rapidly in the rocking, thereby causing a jolt to a user due to the change in acceleration.

An aspect of the present disclosure has been made in view of the above problem. An object of an aspect of the present disclosure is to realize a rocking device that is capable of mitigating a jolt caused by a change in acceleration when rocking a seat or the like.

Solution to Problem

In order to solve the above problem, a rocking device in accordance with an aspect of the present disclosure includes: a support member which supports a body of a user; a motor which rotates a rotation shaft in a first rotation direction and in a second rotation direction that is a rotation direction opposite to the first rotation direction, and thereby supplies motive power for rocking the support member via a gear attached to the rotation shaft; and a controller which controls rocking of the support member via the motor, the support member being configured to make a first motion of moving in a first movement direction, in accordance with rotation of the rotation shaft in the first rotation direction, and make a second motion of moving in a second movement direction, in accordance with rotation of the rotation shaft in the second rotation direction, the controller being configured to control rocking of the support member such that a prescribed stopped period is provided between the first motion and the second motion.

A control method in accordance with an aspect of the present disclosure is a control method of controlling, in a rocking device, rocking of a support member via a motor, the rocking device including: the support member, which supports a body of a user; and the motor, which rotates a rotation shaft in a first rotation direction and in a second rotation direction that is a rotation direction opposite to the first rotation direction, and thereby supplies motive power for rocking the support member via a gear attached to the rotation shaft, the support member being configured to make a first motion of moving in a first movement direction, in accordance with rotation of the rotation shaft in the first rotation direction, and make a second motion of moving in a second movement direction, in accordance with rotation of the rotation shaft in the second rotation direction, rocking of the support member being controlled such that a prescribed stopped period is provided between the first motion and the second motion.

Advantageous Effects of Invention

An aspect of the present disclosure makes it possible to realize a rocking device that is capable of mitigating a jolt caused by a change in acceleration when rocking a seat or the like.

DESCRIPTION OF EMBODIMENTS

The following description will discuss an embodiment of the present disclosure in detail.

Figure 1:
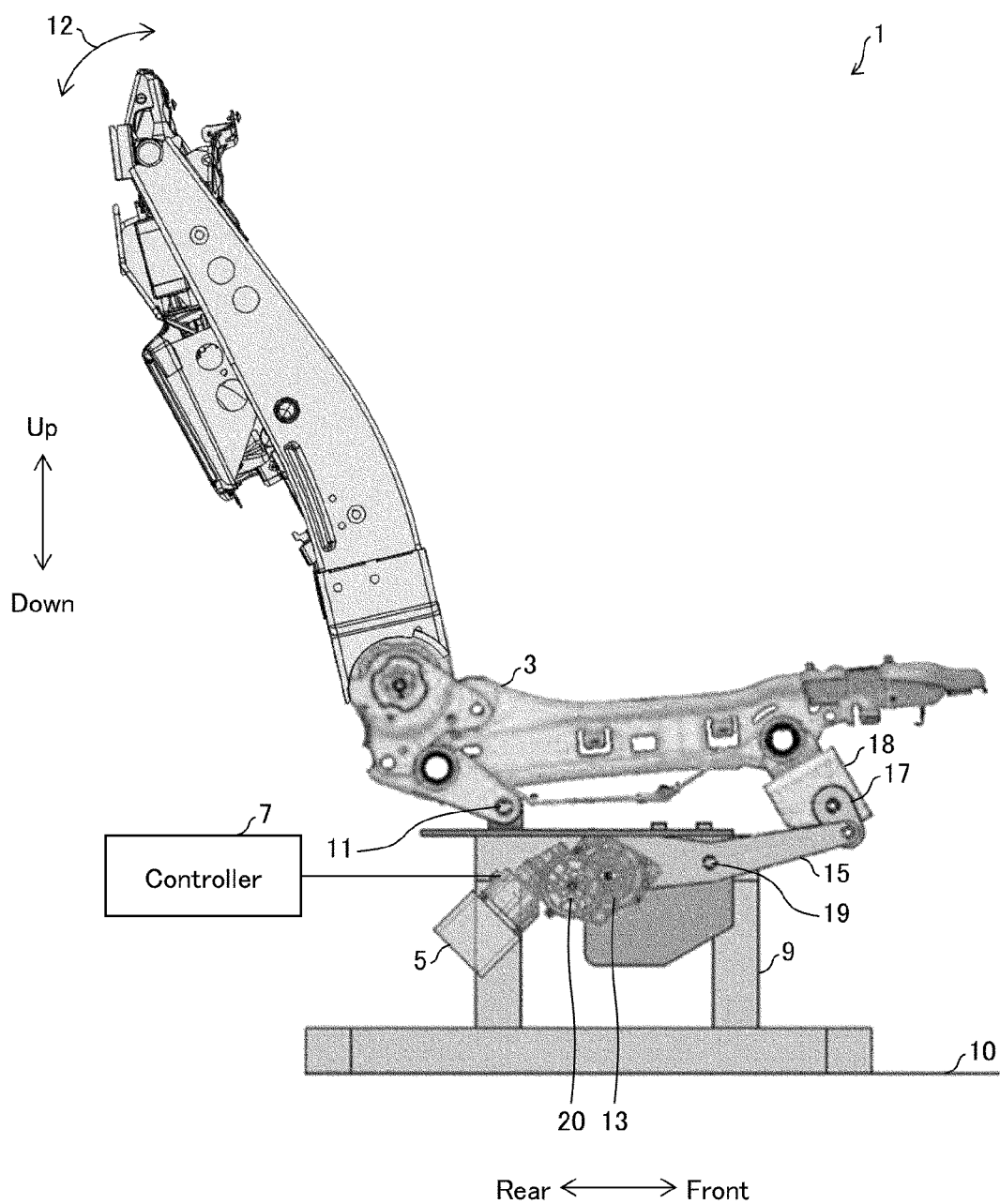
FIG. 1 is a diagram illustrating an example of an external appearance of a rocking device.

1. Example Configuration of Rocking Device and Example Process Performed Thereby FIG. 1 is a diagram illustrating an example of an external appearance of a rocking device 1 in accordance with the present disclosure. As illustrated in FIG. 1, the rocking device 1 includes members such as a seat 3, a motor 5, and a controller 7.

The seat 3 is a support member that supports the body of a user. The following description discusses an example in which the support member is a seat, but this is a non-limiting example. The support member may be a bed, a sofa, or other such members that a user can get onto.

Furthermore, the following description discusses an example in which the seat 3 and the rocking device 1 are provided to a mobile body, but this is a non-limiting example. The seat 3 and the rocking device 1 may be provided to a fixed location, such as in a building. Furthermore, the following description discusses an example in which the mobile body is a wheeled vehicle, but this is a non-limiting example. For example, the mobile body may be a ship, an aircraft, or the like. Furthermore, the rocking device 1 is not limited to being provided to a driver's seat of the mobile body, and may be provided to a seat other than a driver's seat of the mobile body.

The seat 3 is fixed on a base 9 with a fulcrum point 11 serving as an axis, and rocks about the fulcrum point 11 in a pitching direction 12. Here, the rocking of the seat 3 refers to a back and forth motion by the seat 3 in which a first motion and a second motion (described later) are repeated alternately. Rocking of the seat 3 provides the effect of allowing a user sitting on the seat 3 to relax and the effect of stimulating an otolith of the user, which is involved with the sense of balance, so as to induce sleepiness. In the following descriptions, the rightward direction in FIG. 1 will be referred to as "front (frontward)" with respect to the seat 3, and the leftward direction in FIG. 1 will be referred to as "rear (rearward)" with respect to the seat 3.

Figure 2:
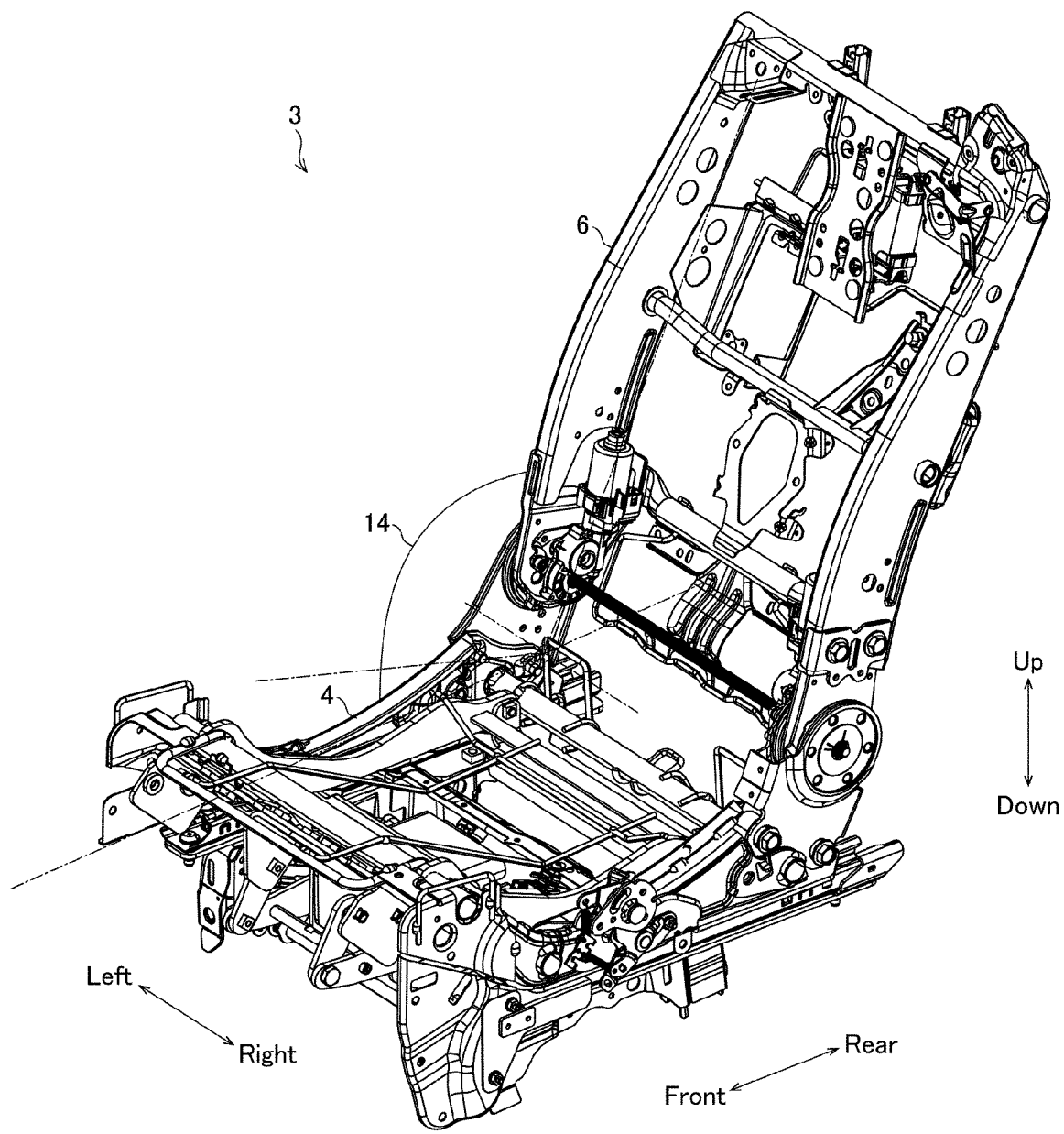
FIG. 2 is a diagram illustrating an example of a frame of a seat.

FIG. 2 is a diagram illustrating an example of a frame of the seat 3. The seat 3 has a seating part 4 and a back part 6. An angle 14 between the seating part 4 and the back part 6 can be adjusted via a reclining function.

Figure 3:
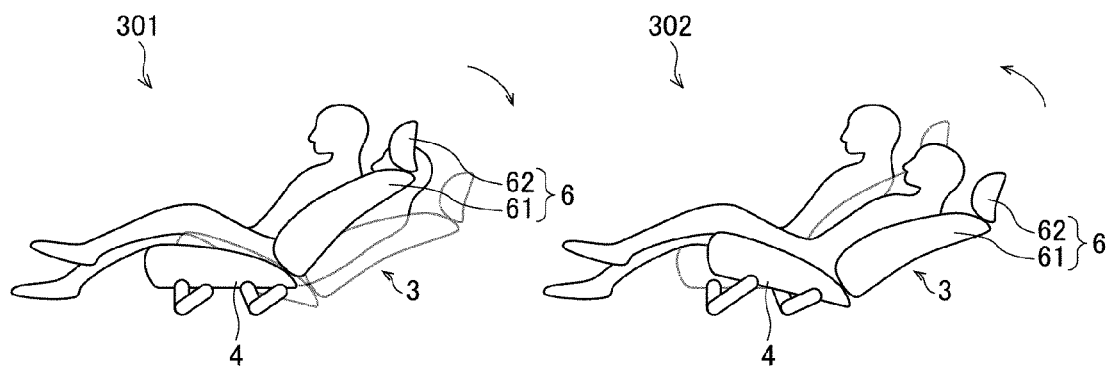
FIG. 3 is a diagram illustrating an example of rocking in the pitching direction of the seat.

The diagrams in FIG. 3 each illustrate an example of rocking in the pitching direction 12 illustrated in FIG. 1. When rocking, the seat 3 alternately repeats a motion of titling rearward as illustrated in side view 301 and a motion of tilting forward as illustrated in side view 302. It is preferable, but not essential, that the rocking occurs in a state in which the angle between the seating part 4 and the back part 6 is fixed, as exemplified in FIG. 3. Note that the back part 6 of the seat 3 may include a seat back 61 and a headrest 62 as illustrated the diagrams in FIG. 3.

In FIG. 1, the base 9, which is fixed to a floor surface 10, is provided with a motor 5 and a plurality of gears including a sector gear 13. On the basis of control by the controller 7, the motor 5 rotates a rotation shaft in a first rotation direction and in a second rotation direction that is a rotation direction opposite to the first rotation direction, and thereby supplies motive power for rocking the seat 3 via a pinion gear 20 attached to the rotation shaft. As one example, the first rotation direction may be defined as leftward rotation (counterclockwise rotation) and the second rotation direction may be defined as rightward rotation (clockwise rotation), or vice versa.

Figure 4:
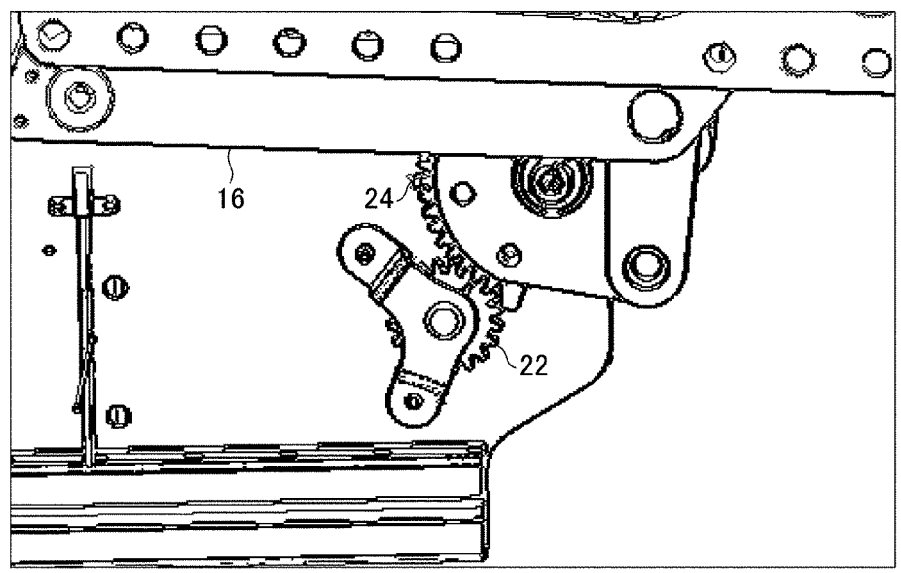
FIG. 4 is a diagram illustrating examples of a pinion gear and a sector gear.

FIG. 4 is a diagram illustrating examples of a pinion gear and a sector gear having shapes differing from those illustrated in FIG. 1. In FIG. 4, a pinion gear 22 is provided to the rotation shaft of the motor 5 illustrated in FIG. 1, and the motive power of the pinion gear 22 is transmitted to a sector gear 24. In one aspect, the sector gear 24 is fixed to a plate 16 for indirectly applying a force to a lower part of the seat 3 illustrated in FIGS. 1 and 2. Alternatively, the sector gear 24 is integrated with the plate 16. Note that one or more other gears may be provided between the pinion gear 22 and the sector gear 24.

In the example illustrated in FIG. 1, a force is applied to the lower part of the seat 3 via a first plate 15 to which is the sector gear 13 is fixed, a second plate 17, and a bracket 18. An angle between the first plate 15 and the second plate 17 and an angle between the second plate 17 and the bracket 18 are variable. The first plate 15 rotates in a given range, about a fulcrum point 19. In other words, when a front part of the first plate 15 is positioned higher, a rear part of the first plate 15 is positioned lower, and when the rear part of the first plate 15 is positioned higher, the front part of the first plate 15 is positioned lower. Left/right rotation of the sector gear 13 causes the front part of the first plate 15 to move up/down, such that the seat 3 repeats a back and forth motion with the fulcrum point 11 serving as an axis.

The rocking device 1 has a rack-and-pinion mechanism that converts rotational motion, in each direction, of the pinion gear 20 provided to the motor 5, into a linear motion that raises and lower the front of the seat 3. Therefore, an upward force and a downward force are alternately applied to the lower part of the seat 3.

The seat 3 makes a first motion of moving in a first movement direction, in accordance with rotation of the rotation shaft of the motor 5 in the first rotation direction. In the present disclosure, "movement" includes a change only in the angle of part or all of the seat 3 with respect to the floor surface 10. The seat 3 also makes a second motion of moving in a second movement direction, in accordance with rotation of the rotation shaft of the motor 5 in the second rotation direction. The "movement" includes a change only in the angle of the seat 3 with respect to the floor surface 10 on which the rocking device 1 is provided. The directions of the arrows for the pitching direction 12 in FIG. 1 are examples of the first movement direction and the second movement direction.

When the rotation shaft of the motor 5 rotates in the first rotation direction, the sector gear 13 rotates in a direction opposite to that when the rotation shaft of the motor 5 rotates in the second rotation direction. For example, in FIG. 1, in a case where the rotation shaft of the motor 5 rotates in the first rotation direction and the sector gear 13 rotates leftward (counterclockwise), the front part of the first plate 15 is lifted upward, and the seat 3 is tilted rearward. In this case, the rearward titling motion of the seat 3 is an example of the first motion, by the seat 3, of moving in the first movement direction.

In a case where the rotation shaft of the motor 5 rotates in the second rotation direction and the sector gear 13 rotates rightward (clockwise), the front part of the first plate 15 is pushed downward, and the seat 3 is tilted forward. In this case, the frontward titling motion of the seat 3 is an example of the second motion, by the seat 3, of moving in the second movement direction.

Figure 5:
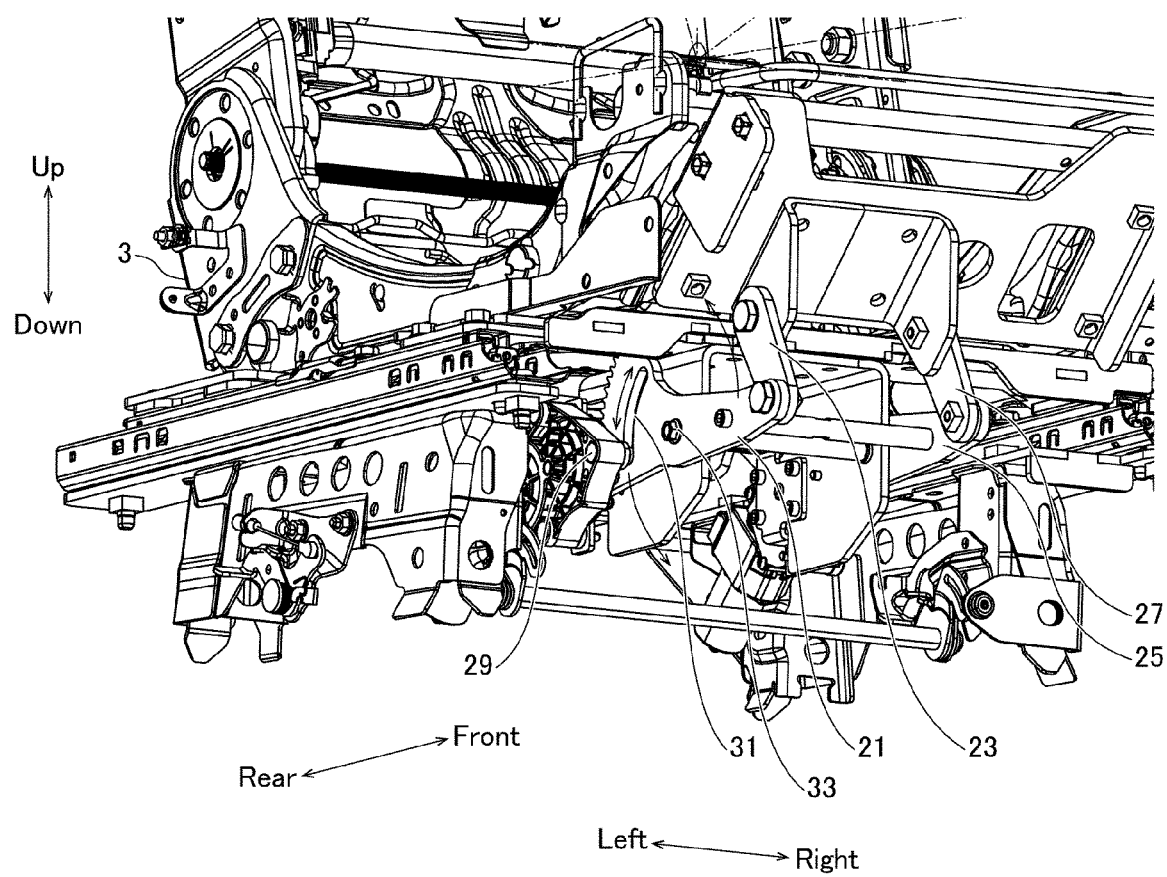
FIG. 5 is an example diagram including the seat and the frame.

FIG. 5 is an example diagram including the seat 3 and the frame. FIG. 5 illustrates an example in which gears of a different shape from those in the configuration illustrated in FIG. 1 are connected to the seat 3. In the example illustrated in FIG. 5, a sector gear is integrated with a first plate 21. Gear teeth of a pinion gear mesh with a gear part of the first plate 21. Provided to the first plate 21 is a hole 31 through which a fixed shaft 29 passes. The position of the fixed shaft 29 is fixed. The first plate 21 rotates, about a fulcrum point 33, in a range in which relative movement of the fixed shaft 29 in the hole 31 is possible. This moves a front part of the first plate 21 up and down and causes rocking of the seat 3.

A third plate 25 and a fourth plate 27 may be provided at respective positions so as to face the first plate 21 and a second plate 23, respectively, in the left-right direction of the seat 3, as exemplified in FIG. 5. This makes it possible to increase the strength of the rocking device 1. The third plate 25 may have a shape so as to be integrated with a sector gear, and the motive power supplied from the motor 5 may be transmitted via the fourth plate 27 to the lower part of the seat 3, but this is not essential.

Figure 6:
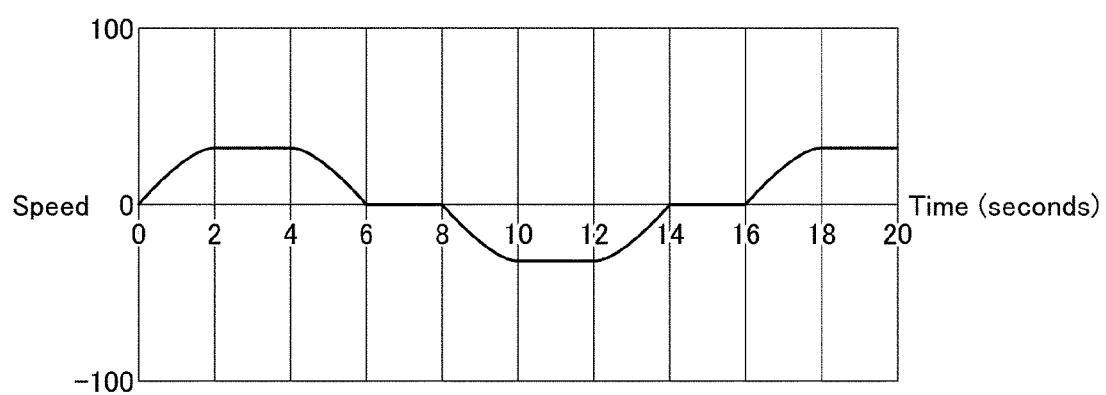
FIG. 6 is a diagram illustrating an example of speeds at which a controller causes the seat to rock.

FIG. 6 is a diagram illustrating an example of speeds at which the controller 7 causes the seat 3 to rock. In the graph in FIG. 6, the horizontal axis represents time (seconds), and the vertical axis represents the speed of rocking. Positive values on the vertical axis represent speed of the first motion, and negative values on the vertical axis represent speed of the second motion. Additionally, the value "100" on the vertical axis indicates a speed of the first motion that corresponds to a maximum rotation speed in a case where the rotation shaft of the motor 5 is rotating in the first rotation direction, and the value "−100" on the vertical axis indicates a speed of the second motion that corresponds to a maximum rotation speed in a case where the rotation shaft of the motor 5 is rotating in the second rotation direction. Furthermore, the value "0" on the horizontal axis corresponds to a given time during rocking of the seat 3.

In the example illustrated in FIG. 6, during the period between the 0-second line and the 2-second line, the controller 7 monotonically increases the speed of the first motion of the seat 3 while moving the seat 3 in the first movement direction, and during the period between the 2-second line and the 4-second line, the controller 7 moves the seat 3 in the first movement direction at a prescribed speed. As illustrated in FIG. 6, a smooth curve is drawn on the portion of the graph corresponding to the period between the 0-second line and the 2-second line. This curve is, for example, a sine curve. The same applies to the portions of the graph corresponding to the period between the 4-second line and the 6-second line and the period between the 16-second line and the 18-second line, where the speed of the first motion changes, and to the portions of the graph corresponding to the period between the 8-second line and the 10-second line and the period between the 12-second line and the 14-second line, where the speed of the second motion changes.

Thus, once the controller 7 has caused the seat 3 to commence the first motion, the controller 7 monotonically increases the speed of the first motion during a period until the speed of the first motion reaches the prescribed speed, and once the speed of the first motion has reached the prescribed speed, the controller 7 causes the first motion to be continued at the prescribed speed for a prescribed period. In the example illustrated in FIG. 6, the prescribed period is 2 seconds, but this is a non-limiting example. For example, the prescribed period may be 1 second, or may be not less than 3 seconds.

During the period between the 4-second line and the 6-second line, the controller 7 monotonically decreases the speed of the first motion while moving the seat 3 in the first movement direction. In other words, when the controller 7 is to cause the seat 3 to end the first motion, the controller 7 monotonically decreases the speed of the first motion during a period until the speed of the first motion reaches zero.

Thus, during the period between the 0-second line and the 6-second line, the controller 7 carries out control to rotate the rotation shaft of the motor 5 in the first rotation direction and cause the seat 3 to make the first motion as described above. In the above discussion, each instance of the wording "speed of the first motion" may be replaced with the wording "rotational speed of the rotation shaft of the motor 5 in the first rotation direction".

During the period between the 6-second line and the 8-second line, the controller 7 stops the seat 3. During the period between the 6-second line and the 8-second line, the seat 3 is positioned at one end of the range of rocking.

Subsequently, during the period between the 8-second line and the 10-second line, the controller 7 monotonically increases the speed of the second motion of the seat 3 while moving the seat 3 in the second movement direction, and during the period between the 10-second line and the 12-second line, the controller 7 moves the seat 3 in the second movement direction at the prescribed speed.

Thus, once the controller 7 has caused the seat 3 to commence the second motion, the controller 7 monotonically increases the speed of the second motion during a period until the speed of the second motion reaches the prescribed speed, and once the speed of the second motion has reached the prescribed speed, the controller 7 causes the second motion to be continued at the prescribed speed for a prescribed period.

During the period between the 12-second line and the 14-second line, the controller 7 monotonically decreases the speed of the second motion while moving the seat 3 in the second movement direction. In other words, when the controller 7 is to cause the seat 3 to end the second motion, the controller 7 monotonically decreases the speed of the second motion during a period until the speed of the second motion reaches zero.

Thus, during the period between the 8-second line and the 14-second line, the controller 7 carries out control to rotate the rotation shaft of the motor 5 in the second rotation direction and cause the seat 3 to make the second motion as described above. In the above discussion, each instance of the wording "speed of the second motion" may be replaced with the wording "rotational speed of the rotation shaft of the motor 5 in the second rotation direction".

During the period between the 14-second line and the 16-second line, the controller 7 stops the seat 3. The seat 3 rocks between the position at which the seat is located during the period between the 6-second line and the 8-second line and the position at which the seat is located during the period between the 14-second line and the 16-second line. From the 16-second line onward, the controller 7 repeats rocking in the same manner as in the period between the 0-second line and the 16-second line.

As described above, the controller 7 is configured to execute a control method for controlling the rocking of the seat 3 such that a prescribed stopped period is provided between the first motion and the second motion. In this configuration, when rocking, the seat 3 temporarily stops before returning back in an opposite direction. This configuration makes it possible to realize the rocking device 1 which is capable of sufficiently mitigating a jolt caused by a change in acceleration when rocking the seat 3. Furthermore, providing a stopped period during the rocking makes it possible to suppress overheating of the motor 5.

The prescribed stopped period is not limited to a specific period, and may be approximately 1 second to 5 seconds, and more preferably may be approximately 2 seconds to 3 seconds. In the example illustrated in FIG. 6, the stopped period is 2 seconds. During a period in which output torque of the motor 5 is zero, even if the seat 3 moves a small amount due to inertia, this may be considered as being included in the stopped period.

2. Variations

The rocking of the seat 3 (i.e., the first motion and the second motion) is not limited to a change only in the angle of the seat 3 with respect to the floor surface 10 on which the rocking device 1 is provided. For example, when rocking, the seat 3 may move in the frontward and rearward directions of the seat 3, as the first movement direction and the second movement direction, while a constant angle is maintained with respect to the floor surface 10. Alternatively, the seat 3 may move in an upward and downward direction with respect to the floor surface 10, as the first movement direction and the second movement direction.

Furthermore, the seat 3 may rock via a reclining function that changes the angle between the seating part 4 and the back part 6. One aspect of the present disclosure may be configured such that the seating part 4 is fixed and increasing and decreasing of only the angle of the back part 6 with respect to the seating part 4 is repeated, in a given range. In a case where the back part 6 includes a seat back 61 and a headrest 62 as described with reference to FIG. 3, the rocking of the seat 3 may be a change in the angle of the headrest 62 with respect to the seat back 61.

Furthermore, the rocking of the seat 3 may be realized as a combination of a plurality of movements. For example, the seat 3 may rock via a combination of a plurality of rocking movements, from among: rocking in which the angle with respect to the floor surface 10 is changed; rocking in which movement occurs in the frontward and rearward directions; rocking in which movement occurs in the upward and downward directions; rocking via a reclining function; and rocking in which the angle of the headrest 62 is changed.

Furthermore, the rocking of the seating part 4 of the seat 3 and the rocking of the back part 6 of the seat 3 may be achieved with separate motors 5 and separate gears. In other words, a mechanism for rocking the seating part 4 and a mechanism for rocking the back part 6 may be independently configured. The same applies to a configuration in which a constant angle is maintained between the seating part 4 and the back part 6 during rocking.

It is not essential for the seat 3 to include the back part 6. A seat 3 which includes the seating part 4 but not the back part 6 may be rocked.

In a case where a plurality of seats 3 are provided in the same mobile body, or in a case where a plurality of seats 3 are provided in proximity to each other, a single controller 7 may control the rocking of the plurality of seats 3. Alternatively, a configuration may be employed in which controllers 7 are prepared in the same number as the seats 3, each controller 7 is in 1-to-1 correspondence with a respective seat 3, and each controller 7 controls rocking of a corresponding seat 3.

Furthermore, the rocking device 1 may be provided to an autonomous driving vehicle. Such a configuration contributes to the promotion of comfortable sleep of all users in seats 3 of an autonomous driving vehicle, for example.

3. Software Implementation Example

The functions of the controller 7 (hereinafter, referred to as "device") can be realized by a program for causing a computer to function as the device, the program causing the computer to function as the control blocks of the device.

In this case, the device includes a computer that has at least one control device (for example, a processor) and at least one memory device (for example, a memory) as hardware for executing the program. The control device and the memory device execute the program, so that the functions described in the above embodiments are realized.

The program can be stored in one or more non-transitory computer-readable storage mediums. The storage medium can be provided in the device, but the storage medium does not need to be provided in the device. In a case where the storage medium is not provided in the device, the program can be supplied to the device via any wired or wireless transmission medium.

Some or all of the functions of the control blocks can be realized by a logic circuit. For example, an integrated circuit in which a logic circuit that functions as each of the control blocks is formed is also encompassed in the scope of the present disclosure. In addition, the function of each of the control blocks can be realized by, for example, a quantum computer.

The present disclosure is not limited to the embodiments described above, but can be altered within the scope of the claims. The present disclosure also encompasses, in its technical scope, any embodiment derived by combining technical means disclosed in differing embodiments.

A rocking device in accordance with Aspect 1 of the present disclosure includes: a support member which supports a body of a user; a motor which rotates a rotation shaft in a first rotation direction and in a second rotation direction that is a rotation direction opposite to the first rotation direction, and thereby supplies motive power for rocking the support member via a gear attached to the rotation shaft; and a controller which controls rocking of the support member via the motor, the support member being configured to make a first motion of moving in a first movement direction, in accordance with rotation of the rotation shaft in the first rotation direction, and make a second motion of moving in a second movement direction, in accordance with rotation of the rotation shaft in the second rotation direction, the controller being configured to control rocking of the support member such that a prescribed stopped period is provided between the first motion and the second motion.

With this configuration, during rocking, a seat or the like which is the support member temporarily stops before returning back in an opposite direction. This makes it possible to realize a rocking device that is capable of mitigating a jolt caused by a change in acceleration when rocking a seat or the like.

In Aspect 2 of the present disclosure, the rocking device in accordance with Aspect 1 is configured such that once the controller has caused the support member to commence the first motion or the second motion, the controller monotonically increases a speed of said motion during a period until the speed of said motion reaches a prescribed speed, and when the controller is to cause the support member to end the first motion or the second motion, the controller monotonically decreases the speed of said motion during a period until the speed of said motion reaches zero.

This configuration makes it possible to further mitigate a jolt caused by a change in acceleration when rocking a seat or the like.

In Aspect 3 of the present disclosure, rocking device in accordance with Aspect 1 or 2 is configured such that during rocking of the support member, an angle of the support member with respect to a floor surface on which rocking device is provided is constant, and the support member moves in a frontward and rearward direction of the support member, as the first movement direction and the second movement direction.

This configuration makes it possible to, for example, perform rocking without tilting the support member.

In Aspect 4 of the present disclosure, the rocking device in accordance with Aspect 1 or 2 is configured such that the support member moves in an upward and downward direction with respect to a floor surface, as the first movement direction and the second movement direction.

This configuration contributes to a reduction in planar space required for providing the rocking device.

In Aspect 5 of the present disclosure, the rocking device in accordance with Aspect 1 or 2 is configured such that the support member is a seat including a seating part and a back part, and rocks via a reclining function that changes an angle between the seating part and the back part.

This configuration makes it possible to, for example, reduce energy consumption in the rocking device and achieve rocking with a comparatively simple configuration.

In Aspect 6 of the present disclosure, the rocking device in accordance with Aspect 1 or 2 is provided to a mobile body.

This configuration contributes to, for example, the promotion of comfortable sleep of a user in a seat of a mobile body.

In Aspect 7 of the present disclosure, the rocking device in accordance with Aspect 6 is provided to an autonomous driving vehicle.

This configuration contributes to the promotion of comfortable sleep of all users in seats of an autonomous driving vehicle, for example.

In Aspect 8 of the present disclosure, the rocking device in accordance with Aspect 2 is configured such that when the controller has monotonically increased the speed of the first motion or the second motion and the speed of said motion has reached the prescribed speed, the controller causes said motion to be continued at the prescribed speed for a prescribed period.

This configuration contributes to a reduction, in the rocking device, of a change in acceleration felt by a user.

A control method in accordance with Aspect 9 of the present disclosure is a control method of controlling, in a rocking device, rocking of a support member via a motor, the rocking device including: the support member, which supports a body of a user; and the motor, which rotates a rotation shaft in a first rotation direction and in a second rotation direction that is a rotation direction opposite to the first rotation direction, and thereby supplies motive power for rocking the support member via a gear attached to the rotation shaft, the support member being configured to make a first motion of moving in a first movement direction, in accordance with rotation of the rotation shaft in the first rotation direction, and make a second motion of moving in a second movement direction, in accordance with rotation of the rotation shaft in the second rotation direction, rocking of the support member being controlled such that a prescribed stopped period is provided between the first motion and the second motion.

This configuration brings about effects similar to those of the rocking device in accordance with Aspect 1 above.

The controller of the rocking device in accordance with each aspect of the present disclosure can be realized by a computer. In such a case, the present disclosure encompasses (i) a control program for realizing the controller via the computer by causing the computer to function as the controller (software element) and (ii) a computer-readable storage medium in which the control program is stored.

REFERENCE SIGNS LIST

1 Rocking device
3 Seat
5 Motor
7 Controller
13, 24 Sector gear
20, 22 Pinion gear

The invention claimed is:

1. A rocking device comprising:
a support member which supports a body of a user;
a motor which rotates a rotation shaft in a first rotation direction and in a second rotation direction that is a rotation direction opposite to the first rotation direction, and thereby supplies motive power for rocking the support member via a gear attached to the rotation shaft; and
a controller which controls rocking of the support member via the motor,
the support member being configured to
make a first motion of moving in a first movement direction, in accordance with rotation of the rotation shaft in the first rotation direction, and
make a second motion of moving in a second movement direction, in accordance with rotation of the rotation shaft in the second rotation direction,
the controller being configured to
control rocking of the support member such that a prescribed stopped period is provided between the first motion and the second motion.

2. The rocking device according to claim 1, wherein
once the controller has caused the support member to commence the first motion or the second motion, the controller monotonically increases a speed of said motion during a period until the speed of said motion reaches a prescribed speed, and
when the controller is to cause the support member to end the first motion or the second motion, the controller monotonically decreases the speed of said motion during a period until the speed of said motion reaches zero.

3. The rocking device according to claim 1, wherein
during rocking of the support member, an angle of the support member with respect to a floor surface on which rocking device is provided is constant, and
the support member moves in a frontward and rearward direction of the support member, as the first movement direction and the second movement direction.

4. The rocking device according to claim 1, wherein the support member moves in an upward and downward direction with respect to a floor surface, as the first movement direction and the second movement direction.

5. The rocking device according to claim 1, wherein the support member
is a seat including a seating part and a back part, and
rocks via a reclining function that changes an angle between the seating part and the back part.

6. The rocking device according to claim 1, wherein the rocking device is provided to a mobile body.

7. The rocking device according to claim 6, wherein the rocking device is provided to an autonomous driving vehicle.

8. The rocking device according to claim 2, wherein when the controller has monotonically increased the speed of the first motion or the second motion and the speed of said motion has reached the prescribed speed, the controller causes said motion to be continued at the prescribed speed for a prescribed period.

9. A control method of controlling, in a rocking device, rocking of a support member via a motor, the rocking device including:
the support member, which supports a body of a user; and
the motor, which rotates a rotation shaft in a first rotation direction and in a second rotation direction that is a rotation direction opposite to the first rotation direction, and thereby supplies motive power for rocking the support member via a gear attached to the rotation shaft, the support member being configured to
- make a first motion of moving in a first movement direction, in accordance with rotation of the rotation shaft in the first rotation direction, and
- make a second motion of moving in a second movement direction, in accordance with rotation of the rotation shaft in the second rotation direction, the method comprising controlling the rocking of the support member such that a prescribed stopped period is provided between the first motion and the second motion.

\* \* \* \* \*